Nov. 11, 1958  A. H. WEBSTER  2,860,005
LATCH CONTROL MEANS FOR A DUMP TRAILER
Filed June 30, 1953  2 Sheets-Sheet 1
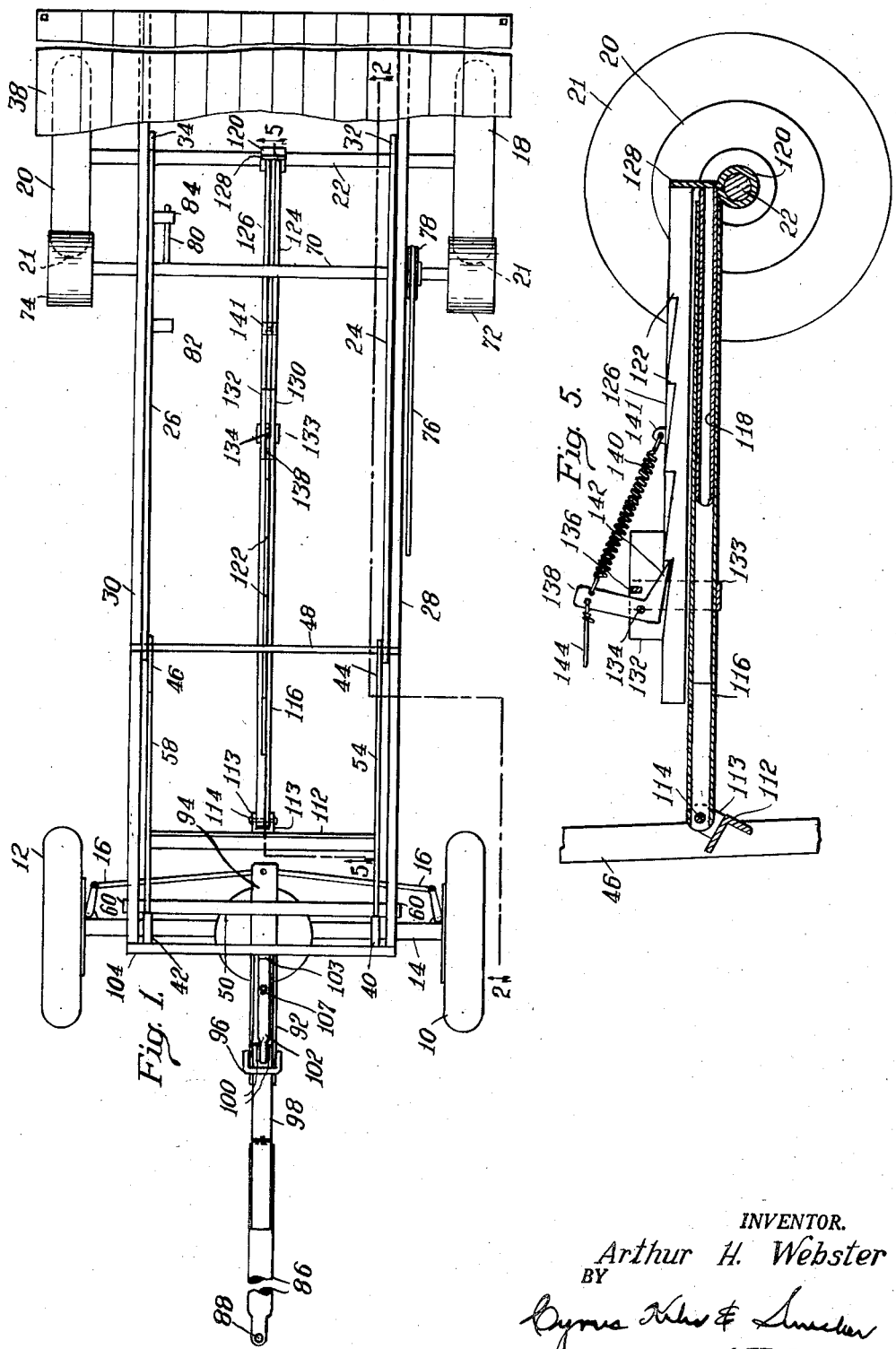
INVENTOR.
Arthur H. Webster
BY
ATTORNEYS

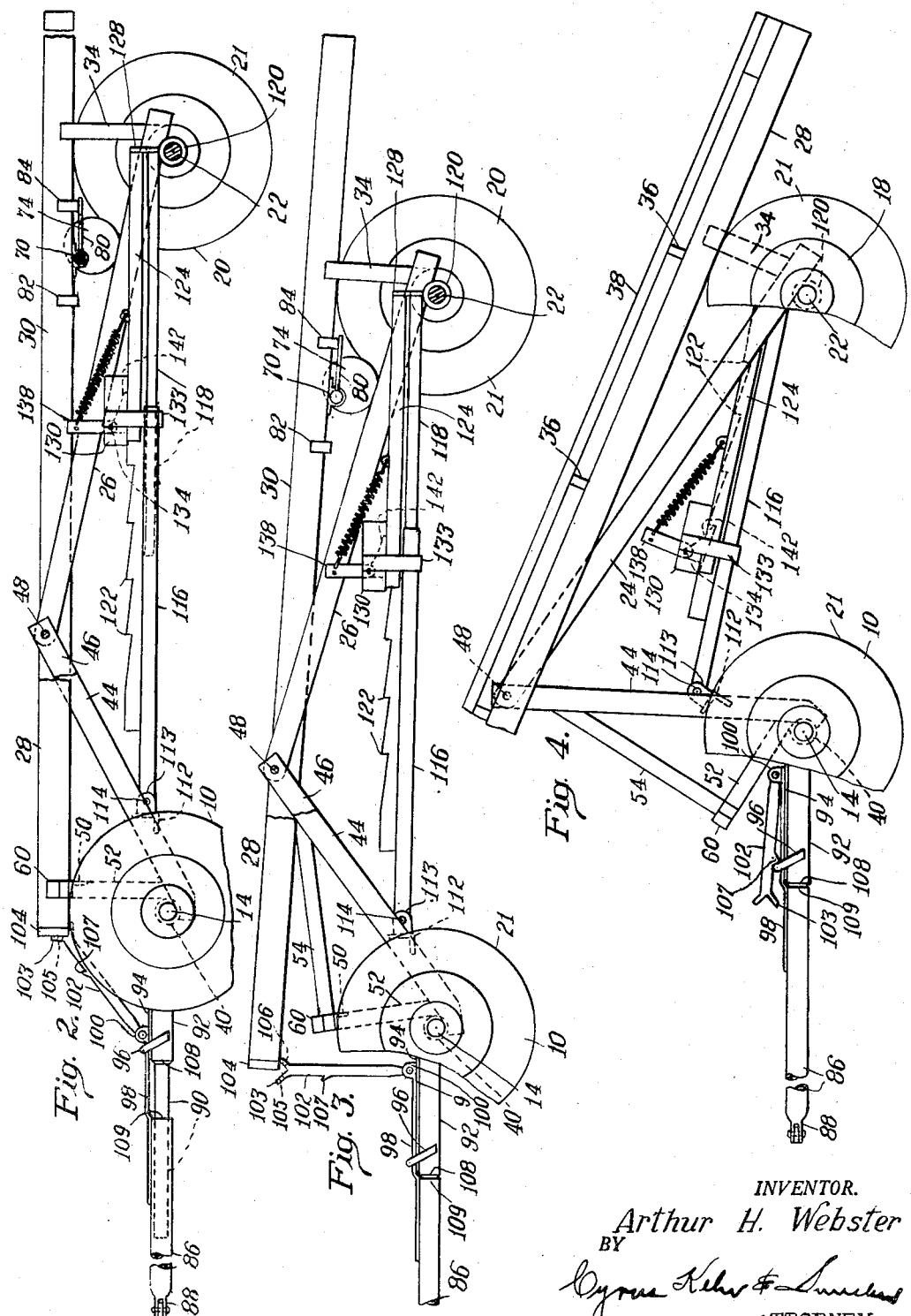

United States Patent Office 2,860,005
Patented Nov. 11, 1958

2,860,005

LATCH CONTROL MEANS FOR A DUMP TRAILER

Arthur H. Webster, Flatwoods, Tenn.

Application June 30, 1953, Serial No. 365,031

8 Claims. (Cl. 298—20)

This invention relates particularly to a latch control means for a dump trailer, and generally to vehicles having tiltable load bearing frames.

Prior to this invention vehicle constructions were known in which the relative bodily motion between two pivot points was utilized to tilt the frame to facilitate loading and unloading thereof. In a typical trailer installation, the front and rear wheels were movable toward or away from one another, the load bearing frame was pivoted about the axis of the rear wheels, and a lever was pivoted with respect to the front wheels and to a portion of the frame. When it was desired to tilt the frame, motion of the rear wheels relative to the ground was restrained, and the front wheels were moved rearwardly to tilt the frame about the axis of the rear wheels. These prior constructions were not entirely satisfactory, however, and it is the primary object of this invention to provide an improved vehicle construction of this general type.

One disadvantage of previous trailer constructions of this type was that the load which could be handled by the trailer was severely limited by the small mechanical advantage available to initiate the tilting action of the frame, this difficulty being due to the near alignment of the pivot between the lever and the frame with the axes of the front and rear wheels. The trailer according to this invention overcomes this disadvantage. A support and guide structure mounted on the front wheels extends upwardly to receive and support the front end of the frame in such a position as to keep the pivot point of the lever on the frame well above the plane containing the axes of the front and rear wheels.

In order to further increase the force available for initiating the tilting motion of the frame, the vehicle of this invention has been provided with an additional frame-raising linkage operated by relative motion between the front wheels and the draft member by which the trailer is towed.

It is a further object of this invention to provide a dumping trailer construction which can be utilized to spread particulate matter over a desired area. This object is accomplished by the provision of means for latching the frame in any one of a plurality of inclined positions. The loaded vehicle is towed as a trailer to the general vicinity in which it is desired to spread the particulate matter, and the frame is then inclined just enough so that the material carried by the frame will be discharged slowly. As the material drops off of the frame, the whole vehicle may be moved about so that the material will be spread over the desired area. The latching structure provided is novel and is particularly suited for the job in that it operates automatically to latch the frame in an inclined position and may be released by controls extending to the tractor or other towing device.

Still another object of this invention is the provision of control means for a trailer of the above type which will enable the operator to dump the trailer load without leaving his position on the tractor or other towing device.

Other objects and advantages of this invention will be apparent as the detailed description of an embodiment thereof proceeds in connection with the accompanying drawings in which:

Fig. 1 is a plan view of a dump trailer according to this invention, with a portion of the load bearing frame broken away;

Fig. 2 is a vertical sectional view taken along the line 2—2 on Fig. 1 and showing the parts in the positions they occupy when the trailer is about to be dumped;

Fig. 3 is a vertical sectional view, similar to Fig. 2, but showing the parts in the positions they occupy after the frame has been partially tilted;

Fig. 4 is a side elevation view showing the trailer of this invention with the frame at its maximum inclination; and Fig. 5 is a detailed vertical sectional view taken along the line 5—5 on Fig. 1, showing the parts in the position they occupy when the frame is in the position shown in Fig. 4.

Referring particularly to the drawings, the numerals 10 and 12 are applied to the front wheels of a trailer according to this invention. These wheels are rotatably mounted on an axle 14 and are steered by a conventional steering linkage 16, controlled through the draft means connecting the trailer with the towing vehicle, not shown.

The rear wheels 18 and 20 are mounted on an axle 22 in a conventional manner. Both the front and rear wheels may be provided with pneumatic tires, as indicated at 21, if desired.

Fixed to the axle 22 by welding, or other suitable means, are two arms 24 and 26, which extend forwardly and upwardly and are welded, or otherwise secured, to longitudinally extending frame members 28 and 30. The rear portions of the frame members 28 and 30 are supported by bars 32 and 34 fixed at their lower ends to the arms 24 and 26. The load bearing platform is mounted on the frame members 28 and 30 in a conventional manner, the transverse elements 36 being secured to the longitudinal frame members 28 and 30 and the actual bed 38 being secured to the transverse elements 36. The bed 38 has been omitted entirely from Figs. 2 and 3, and has been broken away in Figs. 1 and 4.

Bearings 40 and 42 are secured to the front axle 14 and carry rearwardly extending links 44 and 46, which are pivoted adjacent their rear ends on a rod 48 which extends through the levers 24 and 26 and the frame members 28 and 30. A transversely extending frame support 50 is carried by the rearwardly extending links 44 and 46 to take the downward thrust of the load when the frame is in the horizontal position. The support 50 is connected to the links 44 and 46 by brace members 52 and 54 secured to the link 44 and by similar brace members secured to the link 46, the brace member secured to link 46 and corresponding to the brace member 54 being designated 58 in the drawings. The brace member secured to link 46 and corresponding to the brace member 52 is not visible in the views shown in the drawings.

The transversely extending frame support 50 has end portions which extend outwardly beyond the frame members 28 and 30 to form guides to assure the alignment of the frame as it is lowered from the tilted position into a position in which it will be supported by the member 50. As indicated in Figs. 2 and 3, the guiding is accomplished by portions, such as that designated by the numeral 60, which extend upwardly and outwardly. Should the frame be slightly out of alignment, the inclination of these portions will correct the situation.

A transversely extending brake shaft 70 is rotatably mounted on the frame members 28 and 30 and carries on its ends eccentric brake elements 72 and 74, in position to engage the tires 21 on the rear wheels 18 and 20. The brake elements 72 and 74 are so located that their surfaces may be forced into positions in which they will deflect the tires 21 to such an extent as to provide a frictional lock between the brake elements and the rear wheels 18 and 20. Control of the brake elements is achieved by a rope 76 fixed at one end on a pulley 78 attached to the brake shaft 70. The rope 76 extends forwardly to the tractor so that the brake may be applied without requiring the operator to leave his position.

Since ordinarily it will be desired to have the brake either fully applied or fully released, the motion of the brake shaft 70 is preferably restricted. A lever 80 is fixed to the shaft 70 in position to engage the lower surfaces of studs 82 and 84 attached to the frame member 30. When the lever 80 is in contact with the under side of the stud 82, the eccentric brake elements 72 and 74 will be entirely out of engagement with the surfaces of the pneumatic tires 21 on the rear wheels 18 and 20. When the lever 80 engages the under side of the stud 84, as indicated in Figs. 2 and 3, the brake will be fully applied. Portions of the brake structure have been omitted in Figs. 2, 3 and 4 in the interest of clarity.

The brake arrangement just described is capable of preventing rearward motion of the rear wheels but is not capable of preventing forward motion of the wheels. If a force is applied to the rear wheels, tending to rotate them in a forward direction, the eccentric brake elements 72 and 74 will be disengaged from the wheels by rotation of the shaft 70. However, rotation of the wheels in a rearward direction merely tends to roll the eccentric brake elements 72 and 74 into a tighter engagement with the pneumatic tires 21. Of course, a limiting position is reached when the portions of maximum offset of the eccentric elements come into alignment with the axes of shaft 70 and axle 22. The stud 84 is so located as to prevent movement of the brake elements beyond this limiting position.

When the brake elements 72 and 74 are moved into engagement with the tires 21 on the rear wheels 18 and 20 and a rearward force is applied to the front wheels 10 and 12 of the trailer, the front wheels will move toward the rear wheels to increase the inclination of the levers 44 and 46 with respect to the ground and cause the load bearing bed 38 to tilt. By reason of the fact that the frame support 50 holds the pivot rod 48 well above the plane containing the axes of the front and rear wheels, the levers 44 and 46 will be at a sufficient inclination to give the rearward force a substantial upward component even at the beginning of the dumping operation. However, it will be apparent that the amount of force which can be effectively applied is limited by the amount of friction developed between the rear wheels and the ground, and that the initial inclination of the levers 44 and 46 is limited by space requirements. Consequently, it is necessary to employ additional bed-tilting means when very heavy loads are to be handled, and according to this invention, such means is associated with the elements by which the vehicle is towed.

The towing force is applied to the trailer of this invention through a draft member 86 having a bifurcated end portion 88 adapted for attachment to the tractor or other towing device. The draft member 86 is tubular and slidably receives a rod 90 extending forwardly from a block 92 attached to a plate 94 which is pivoted on the front axle 14. The plate 94 extends rearwardly past the pivot point for connection to the steering linkage 16, previously mentioned. At its forward end, the block 92 has secured thereto a generally U-shaped guide member 96. A slide 98, welded or otherwise secured to the upper surface of the draft member 86, extends rearwardly underneath the U-shaped guide member 96.

Mounted on the rear end of the slide 98 is a pair of upstanding ears 100 to which a short starter lever 102 is pivoted. The starter lever 102 has a forked upper end portion 103 which is adapted to engage a transverse frame member 104 connecting the longitudinally extending frame members 28 and 30. The forked portion 103 may conveniently be guided into engagement with the edge of frame member 104 by a rope (not shown) passing upwardly from the hole 105 in the front leg of the forked portion 103 of the starter lever 102, over a small pulley (not shown) mounted on the front face of the frame member 104, and then forwardly to the tractor. Alternatively, the forked portion 103 may be guided by a rope (not shown) passing upwardly from the hole 106 in the rear leg of the forked portion 103, behind the frame member 104, and then forwardly over the top of the frame member to the tractor. The ropes and guiding structure have been omitted from the drawings in the interest of clarity.

When the parts are in the positions illustrated in Fig. 2 and a rearwardly directed force is applied to the draft member 86, the ears 100 will move rearwardly relative to the front axle 14 and the upper end portion 103 of the starter lever 102 will be elevated to start the tilting motion of the frame about the axis of the rear wheels. The relatively large initial inclination of the starter lever 102 gives the rearwardly directed force a large upward component.

The forward face of the starter lever 102 is formed with a pointed projection 107 for engaging the U-shaped guide member 96 when the starter lever 102 is moved about its pivot to its forwardmost position (Fig. 4). It is through this projection 107 and the guide member 96 that the towing force applied by the tractor to the draft member 86 is transmitted to the front axle 14. Since the end 108 of the block 92 and the end 109 of the draft member 86 are close together when the projection 107 is in engagement with the U-shaped guide 96, there will be very little play in the draft linkage as the trailer is towed over irregular terrain.

Another novel feature of this invention is the latching structure which permits the trailer to be moved about while its bed is in an inclined position.

An angle bar 112 is secured to the levers 44 and 46 and carries a pair of ears 113 on its rear surface. A pivot pin 114 passes through the ears 113 and through a rearwardly extending pipe 116. A rod 118 is slidably mounted within the pipe 116 and extends rearwardly for connection to a bearing sleeve 120 rotatably supported by the rear axle 22. The upper surface of the pipe 116 has secured thereto a notched member or ratchet 122. A pair of guide members 124 and 126 are supported on the bearing sleeve 120 through a plate 128 in position to guide the ratchet member 122 as the pipe 116 moves relative to the rod 118. Near their front ends the guide members 124 and 126 have enlarged portions 130 and 132, connected by a guide strap 133 sliding over the pipe 116, by a pivot pin 134, and by a spacer 136. Mounted on the pivot pin 134 is a latch 138, the lower end or point 142 of which is adapted to engage the notches in the notched member 122. A spring 140, omitted from Fig. 1 but shown elsewhere, is connected to the ears 141 on the guide members 124 and 126 and to the latch 138 to bias the latch so that its point 142 will move readily into one of the notches of the notched member 122. A rope 144 is connected to the latch 138 and extends forwardly to the tractor to provide for the convenient release of the latch.

When the front wheels are moved toward the rear wheels, the pipe 116 will slide rearwardly over the rod 118, and the notched member 122 will pass under the latch 138. When the desired inclination of the trailer bed has been effected and a forward pull is applied to the front wheels, the latch point 142 will engage the rear wall of whatever notch it happens to be in at the time to prevent further movement of the front wheels away from the rear wheels. By applying an additional pull to the front wheels, the trailer can be moved forward bodily with the trailer bed at the desired inclination. The provision of a plurality of notches in the notched member 122 allows the operator to select an inclination which is most advantageous for the particular task confronting him.

Rearward motion of the front wheels relative to the rear wheels is limited by the length of the pipe 116, which, as shown in Fig. 5, abuts the bearing sleeve 120 when the maximum bed inclination is attained. In this position the latch 138 engages the forwardmost notch in the notched member 122 to also prevent forward motion of the front wheels relative to the rear wheels. In this position of the parts, the trailer may be moved either forwardly or rearwardly without disturbing the inclination of the load bearing bed 38. It is preferred that the rear end of the bed 38 be spaced from the ground in this position of the parts to avoid possible difficulties when the vehicle is used in places where the ground is not level.

The novel latching structure of this invention is very helpful to the operator in loading and unloading the trailer. Additionally it permits the use of the trailer in the spreading of material over substantial areas of the ground.

A brief summary of the operation of the structure previously described in detail may be helpful to a complete and thorough understanding of the invention. When the trailer is being towed from place to place, the starter lever 102 and the draft mechanism will occupy positions such as shown in Fig. 4, but the rest of the structure will occupy a positional relationship such as that shown in Fig. 2. When inclination of the trailer bed 38 is desired, the rope 76 is pulled by the operator to rotate the brake shaft 70 and bring the brake elements 72 and 74 into contact with the pneumatic tires 21 on the rear wheels 18 and 20. The tractor is then backed slightly to release the projection 107 of the starter lever 102 from the U-shaped guide 96 and roll the rear wheels back sufficiently to roll the brake elements 72 and 74 into the position in which they will exert their maximum braking effect. After moving the tractor forwardly to extend the draft linkage, a rope extending from one of the holes 105 and 106 may be manipulated to lift the starter lever 102 so that it will engage the frame member 104. At this moment the parts would be in the positions shown in Fig. 2.

Subsequent rearward motion of the tractor would move the draft member 86 rearwardly relative to the front wheels 10 and 12 to actuate the starter lever 102 and initiate tilting of the frame. As the end 109 of the draft member 86 comes into contact with the end 108 of the block 92 (Fig. 3), the burden of lifting the frame will be shifted to the levers 44 and 46. Counterclockwise motion of the levers 44 and 46 about the front wheel axis moves the frame support 50 into engagement with the starter lever 102 to return it to the position shown in Fig. 4.

When the desired inclination has been effected, the latch 138 will engage the notched member 122, and the tractor may be moved forwardly to automatically release the brake elements 72 and 74 and to move the trailer bodily forward with the bed 38 in the inclined position. The bed 38 may be returned to the horizontal position by pulling on the rope 144 to raise the point 142 of the latch 138 over the top edge of the rear wall of the notch in member 122 with which it is engaged and then moving the front wheels forwardly.

Although the invention has been described with reference to a four-wheeled trailer, it will be apparent that certain features thereof are not limited in their application to a vehicle of this particular type. Furthermore, various modifications will be obvious to those skilled in the art. Consequently, the foregoing description is to be considered as an example only, and the scope of the invention is to be determined from the claims which follow.

I claim:

1. A vehicle comprising front and rear ground engaging means, front and rear pivot means, means mounting said front and rear ground engaging means on said front and rear pivot means, means holding said front and rear pivot means in spaced relation, extensible draft means mounted forward of said front pivot means and connected thereto, pivot means attached to said draft means on top thereof, a starter lever pivoted at one end to the pivot means attached to the top of said draft means, a load bearing frame above said front and rear pivot means and tiltably mounted on said rear pivot means, said starter lever having a forked end opposite the pivoted end engageable with said load bearing frame.

2. A vehicle comprising front and rear ground engaging means, front and rear pivot means, means mounting said front and rear ground engaging means on said front and rear pivot means, extensible means holding said front and rear pivot means in spaced relation, extensible draft means mounted forward of said front pivot means and connected thereto, pivot means attached to said draft means on top thereof, a starter lever pivoted at one end to the pivot means attached to the top of said draft means, a load bearing frame tiltably mounted on and above said front and rear pivot means, said starter lever having a worked end opposite the pivoted end and engageable with said load bearing frame, a U-shaped guide member attached to said extensible draft means, and a pointed projection on said starter lever engageable with said U-shaped guide member.

3. A load bearing vehicle comprising front and rear ground engaging means, front and rear pivot means connected to said front and rear ground engaging means and movable toward or away from one another, a draft member comprising a stationary and an extensible part, said stationary part being connected to said front pivot means, said extensible part being connected to the stationary part for limited forward or rearward motion relative thereto and for connection to a tractor or the like, a brake associated with said rear ground engaging means to restrict motion of said rear ground engaging means, control means for said brake for extension forwardly to said tractor, a load bearing frame above said pivot means, a first lever pivoted at one end on said front pivot means and at the other end on said load bearing frame, a second lever pivoted at one end on said rear pivot means and at the other end on said first lever and said load bearing frame, a bar rigidly attached at one end to said frame and at the other end to said rear pivot means, a starter lever pivotally connected to said stationary part of the draft member, a guide member fixed to said stationary part, said starter lever having a forked portion at one end to engage said frame to tilt said frame about said rear pivot means upon rearward motion of said extensible part of said draft member relative to said front pivot means, and a hook portion on one side to connect with said guide member to prevent forward motion of said last-mentioned part of said draft member relative to said front pivot means, frame support means means connected to said first pivot means automatically effective after said starter lever has tilted said frame to shift said starter lever about its pivot to a position where it will connect with said guide member, latch means comprising a ratchet member pivotally connected with said front pivot means and a latch member pivoted to said rear pivot means automatically operating after the front and rear pivot means have moved together to a predetermined distance to prevent separation of said pivot means, and control means for releasing said latch means for extension forwardly to said tractor.

4. In a vehicle comprising front and rear ground engaging means, a load bearing frame tiltably mounted on said ground engaging means, extensible draft means located forwardly of said front ground engaging means and connected thereto and being movable toward or away from said front ground engaging means, a starter member having its lower end attached to said draft means and its upper end for coacting with said frame to cause said frame to tilt as said extensible draft means is moved relative to said front ground engaging means, the improvement which comprises a first connector means carried by said rear ground engaging means, a second connector means carried by said front ground engaging means, one of said connector means being shaped to provide a guideway in which a portion of the other of said connector means may slide as said front ground engaging means is moved relative to said rear ground engaging means, an obstruction on one of said connector means engaging one of said ground engaging means for preventing said front and rear ground engaging means from approaching each other to cause the rear end of the frame to touch the ground, a member mounted on one of said connector means and having a plurality of notches therein, a pivoted latch on the other of said connector means, a spring urging said latch into engagement with said notched member, and latch releasing means by which said latch may be moved against the action of said spring, each of said notches having a first surface portion over which said latch may ride as said ground engaging means approach each other and a second surface portion cooperating with said latch to prevent movement of said ground engaging means away from each other, whereby the vehicle may be moved over the ground with the load bearing frame held in a tilted position.

5. A vehicle comprising a tiltable load bearing frame, front and rear wheel assemblies extending transversely of and perpendicular to the length of said frame, said rear wheel assembly being fixedly connected to the frame thereabove, said front wheel assembly being swingably connected to the frame thereabove, means to hold one of said wheel assemblies against movement, means to move the other wheel assembly toward said one wheel assembly, extensible latch means between said front and rear assemblies comprising a longitudinally extending ratchet bar pivotally connected at one end to one of said wheel assemblies, a longitudinally extending latch bar pivotally connected at one end to the other wheel assembly and slidably engaged by the ratchet bar, said bars being movable toward or away from each other, a pivoted latch on said latch bar engageable with the teeth on said ratchet bar, whereby said frame is held in adjusted tilted position after one of said wheel assemblies is moved toward or away from the other wheel assembly.

6. A vehicle comprising a tiltable load bearing frame, front and rear ground engaging means extending transversely perpendicularly below the front and rear ends of said frame, said read ground engaging means being fixedly connected to the frame, links pivotally connected between said front ground engaging means and said frame, extensible latch means between said levers and said rear ground engaging means, means to block movement of one of said ground engaging means, means to move the other ground engaging means toward or away from said first ground engaging means, whereby after relative movement of said ground engaging means on the ground said frame will be held in adjusted tilted position by said latch means.

7. In a load bearing vehicle, a load bearing frame, first and second pivots extending transversely perpendicularly to the length of said frame, wheels mounted on said pivots, means supporting said frame on said wheels comprising a rotatable member pivoted on said first pivot and on said frame, means fixing the second pivot to said frame, means for adjustably holding said wheels in spaced relation comprising a ratchet member and a latch member, said latch member connected to said first pivot, means connecting said ratchet member to said second pivot, said ratchet member and said latch member engaging adjustably together.

8. In a vehicle, a load bearing frame, a link member pivotally engaged to the frame near one end thereof, a bar member connected at one end to said pivotal connection, spaced pivot means, said members engaging said pivot means at their opposite ends, means fixedly connecting the other end of said frame to the other end of said bar member, means to adjustably hold the pivot means in spaced relation comprising interengaged ratchet and latch means connected to said pivot means.

References Cited in the file of this patent

UNITED STATES PATENTS

| | | |
|---|---|---|
| 83,721 | Moore et al. | Nov. 3, 1868 |
| 538,203 | Tracy et al. | Apr. 23, 1895 |
| 670,605 | Chevalier | Mar. 26, 1901 |
| 674,959 | Carroll | May 28, 1901 |
| 966,164 | Carey | Aug. 2, 1910 |
| 1,152,510 | Hunt | Sept. 7, 1915 |
| 1,563,685 | Boys | Dec. 1, 1925 |
| 2,436,443 | Meisenhelder | Feb. 24, 1948 |
| 2,440,325 | Bruno | Apr. 27, 1949 |
| 2,507,033 | Marquis | May 9, 1950 |

FOREIGN PATENTS

| | | |
|---|---|---|
| 22,190 | Finland | Jan. 22, 1948 |
| 972,196 | France | Aug. 23, 1950 |
| 587,223 | Great Britain | Apr. 17, 1947 |
| 61,296 | Norway | Aug. 14, 1939 |